United States Patent [19]
Onozawa et al.

[11] Patent Number: 5,717,296
[45] Date of Patent: Feb. 10, 1998

[54] DISPLAY DEVICE

[75] Inventors: Makoto Onozawa, Yokohama; Masatoshi Koike, Zushi, both of Japan

[73] Assignee: Hitachi, Ltd., Tokyo, Japan

[21] Appl. No.: 638,837

[22] Filed: Apr. 29, 1996

[30] Foreign Application Priority Data

May 8, 1995 [JP] Japan .................................. 7-109689
Aug. 2, 1995 [JP] Japan .................................. 7-197505

[51] Int. Cl.$^6$ .............................. G09G 1/04; H01J 29/74
[52] U.S. Cl. ............................................. 315/371; 315/395
[58] Field of Search ................................. 315/371, 395, 315/370

[56] References Cited

U.S. PATENT DOCUMENTS 5,059,874 10/1991 Oliver ........................................ 315/411
5,220,251 6/1993 Gawell et al. ............................ 315/371

FOREIGN PATENT DOCUMENTS 52-89024 7/1977 Japan .

*Primary Examiner*—Gregory C. Issing
*Attorney, Agent, or Firm*—Fay, Sharpe, Beall, Fagan, Minnich & McKee

[57] ABSTRACT

A horizontal saw tooth wave voltage VSAW is compared with an error output voltage VVP from the error amplifier circuit 115 in level by the comparator 16 and a comparison output voltage VCO of a square wave is obtained. The transistor 19 performs the switching operation at the comparison output voltage VCO, and a horizontal size control current IO flowing via the choke coil 21 is controlled by it, and a horizontal deflection current $I_{DY}$ in the horizontal deflection output circuit 65 is controlled. The comparison output voltage VCO is inverted and integrated by the inverter 24 and the integral circuit 23 in the feedback voltage generation circuit 80 and a feedback voltage VFB is generated. The feedback voltage VFB is supplied to the error amplifier circuit 115 together with a horizontal size reference voltage Vref for deciding the horizontal size of the screen and the level of the error output voltage VVP is controlled so that a relation that these levels are fixed is established.

7 Claims, 16 Drawing Sheets

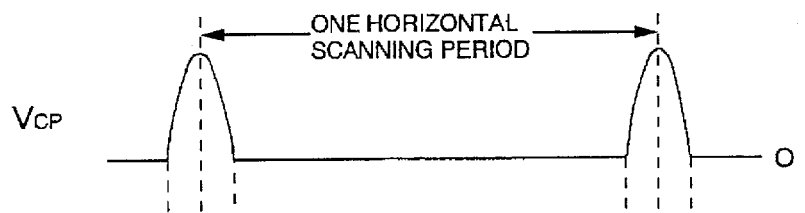
FIG. 2a   $V_{CP}$
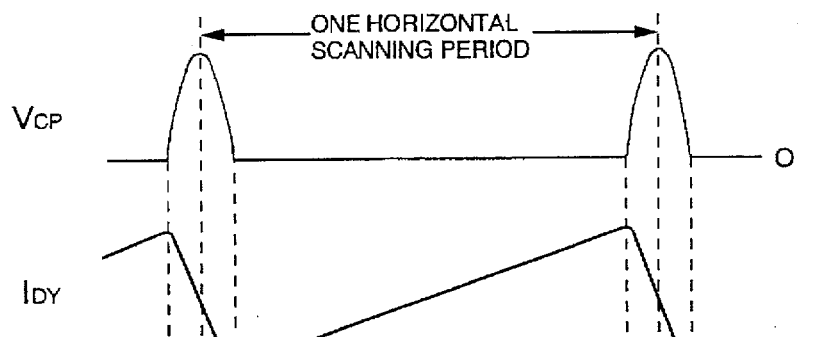
FIG. 2b   $I_{DY}$
FIG. 2c   $V_{SAW}$   $V_{VP}$
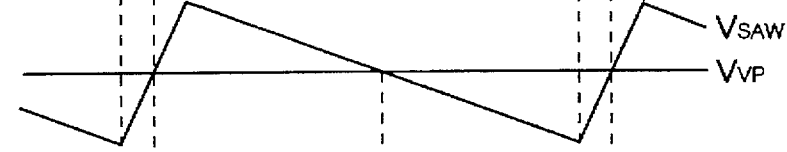
FIG. 2d   $V_{Co}$
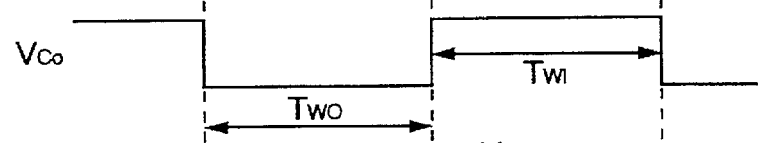
FIG. 2e   $V_o$
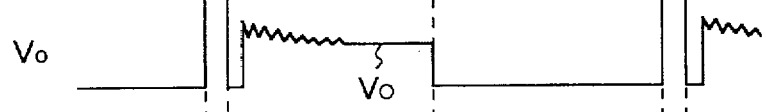
FIG. 2f   $V_{CN}$
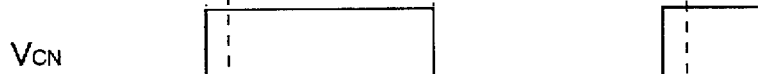
FIG. 2g   $V_{FB}$
FIG. 2h   $I_o$
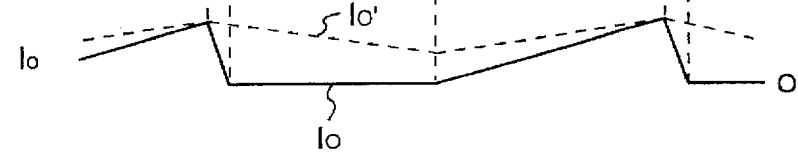

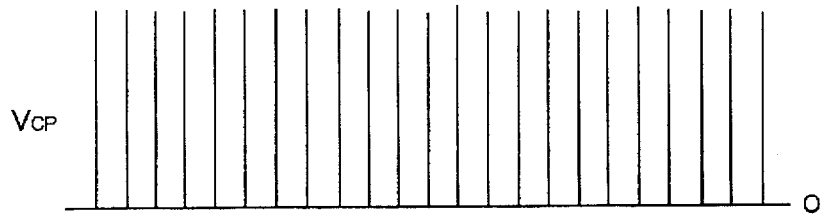
FIG. 3a  $V_{CP}$
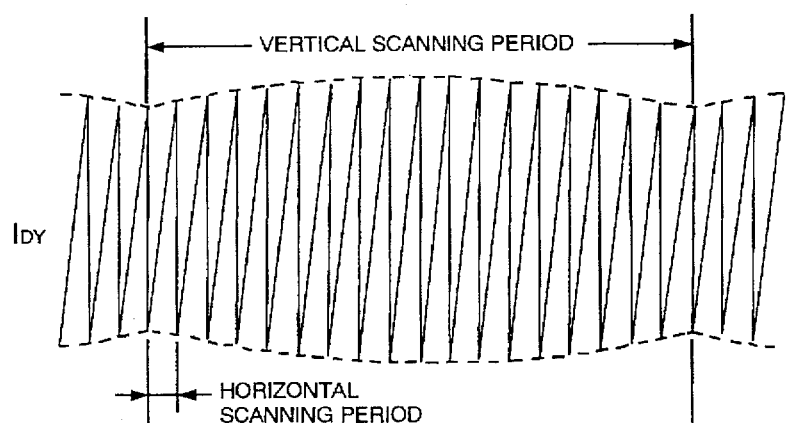
FIG. 3b  $I_{DY}$
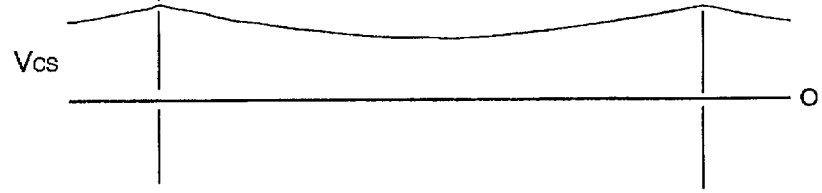
FIG. 3c  $V_{CS}$
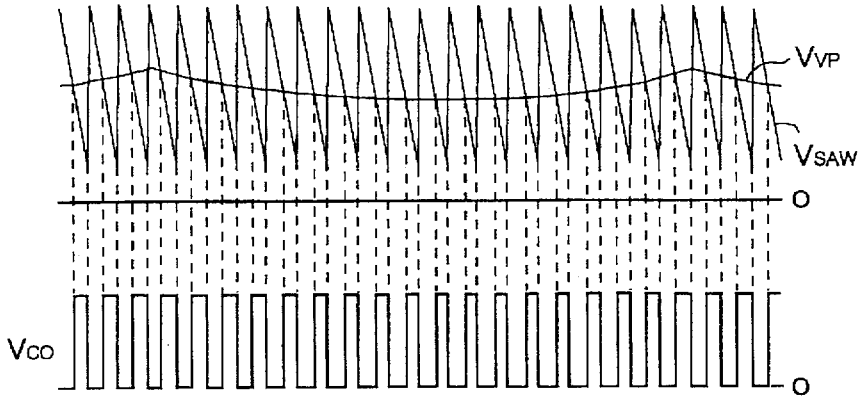
FIG. 3d
FIG. 3e  $V_{CO}$

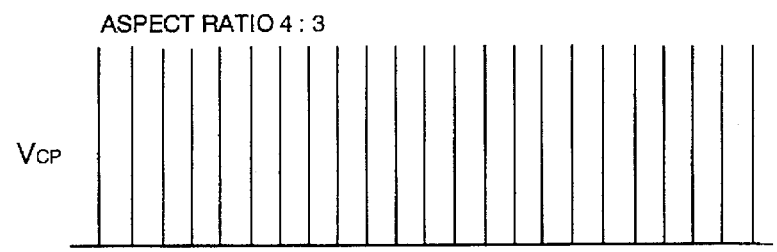
FIG. 4a  V<sub>CP</sub>
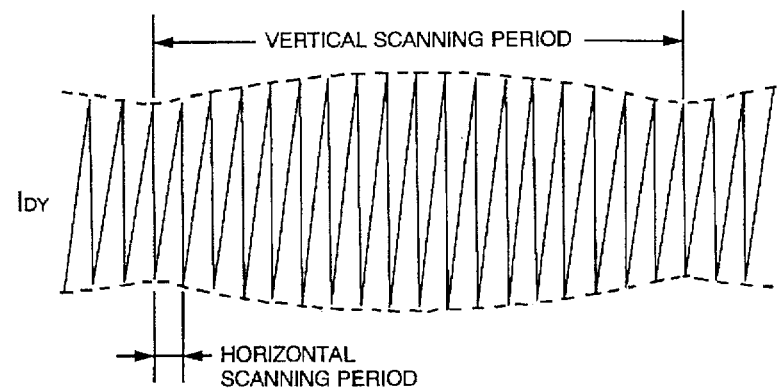
FIG. 4b  I<sub>DY</sub>
FIG. 4c  V<sub>CS</sub>
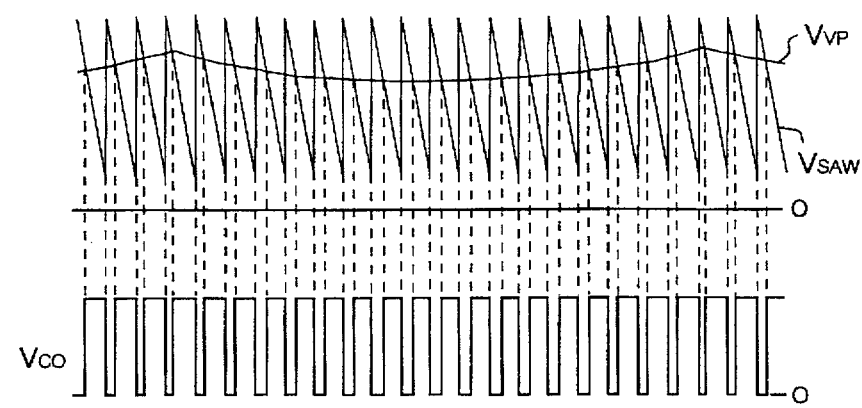
FIG. 4d
FIG. 4e  V<sub>CO</sub>

FIG. 5
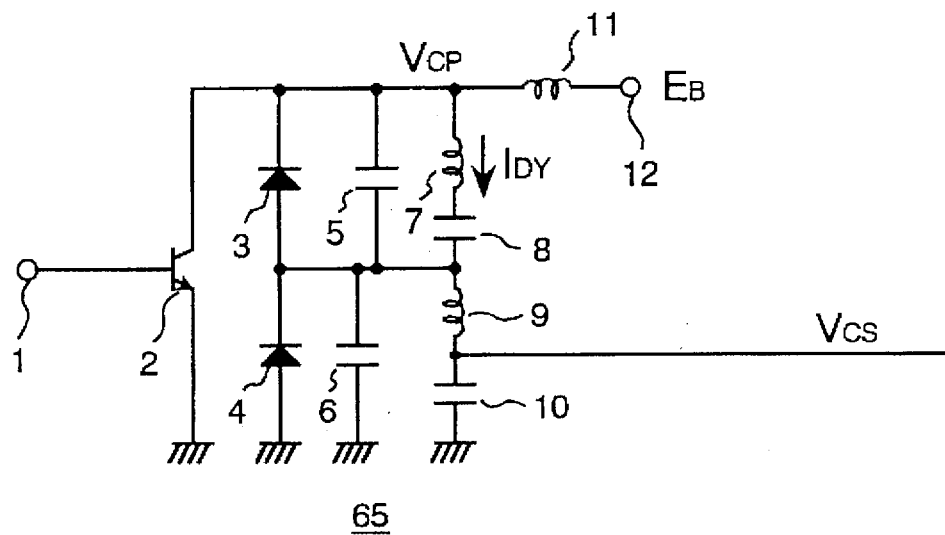
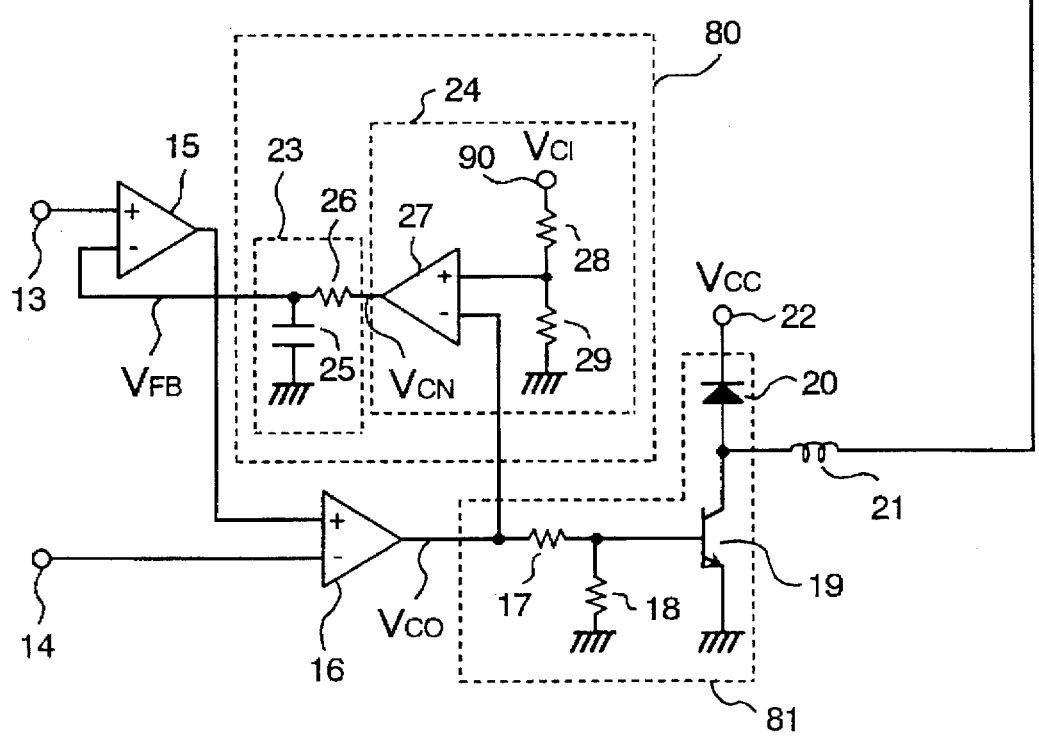

FIG. 6
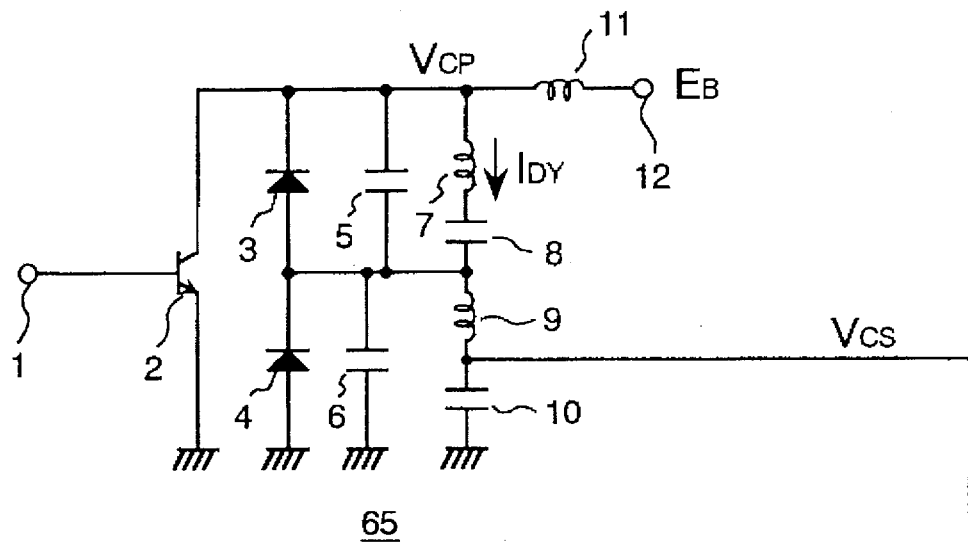
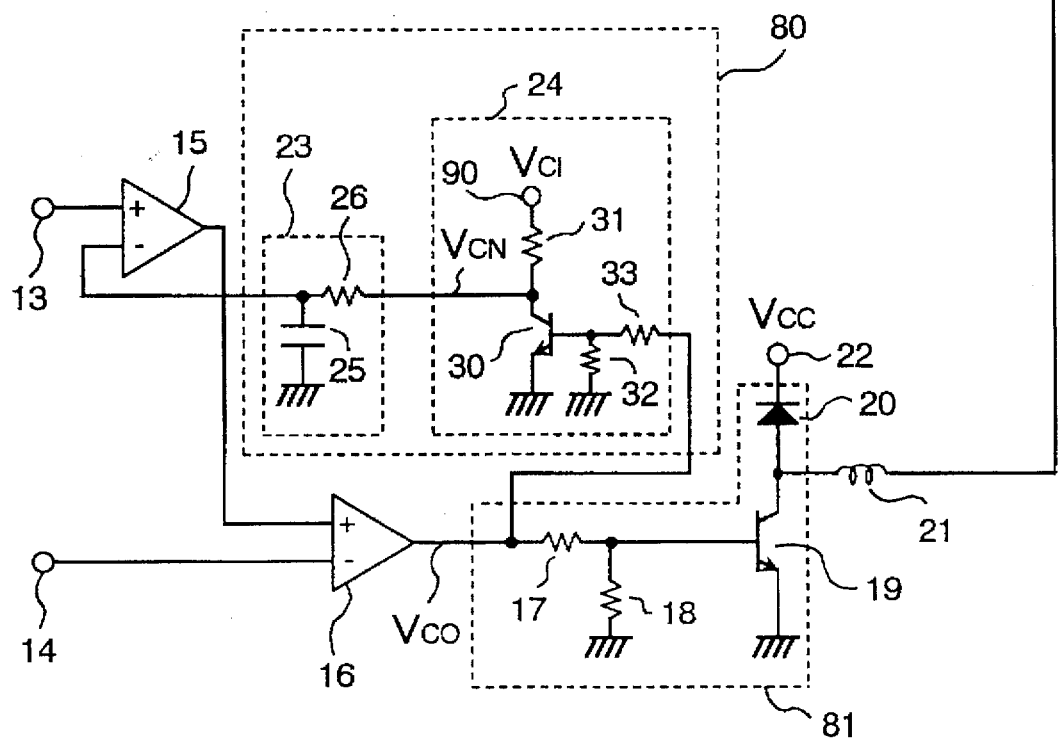

FIG. 7
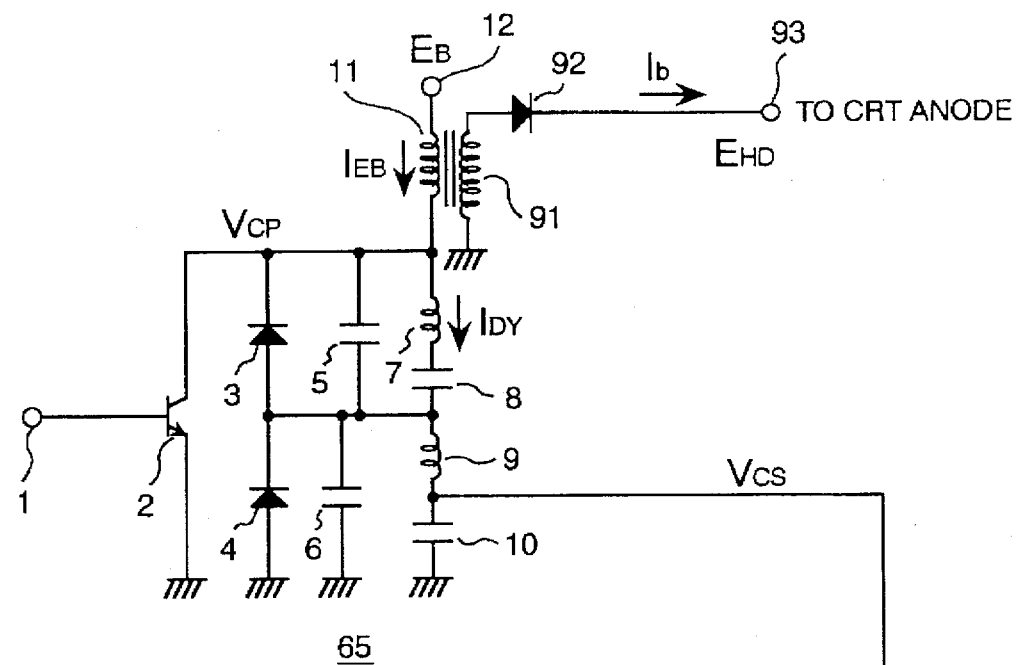
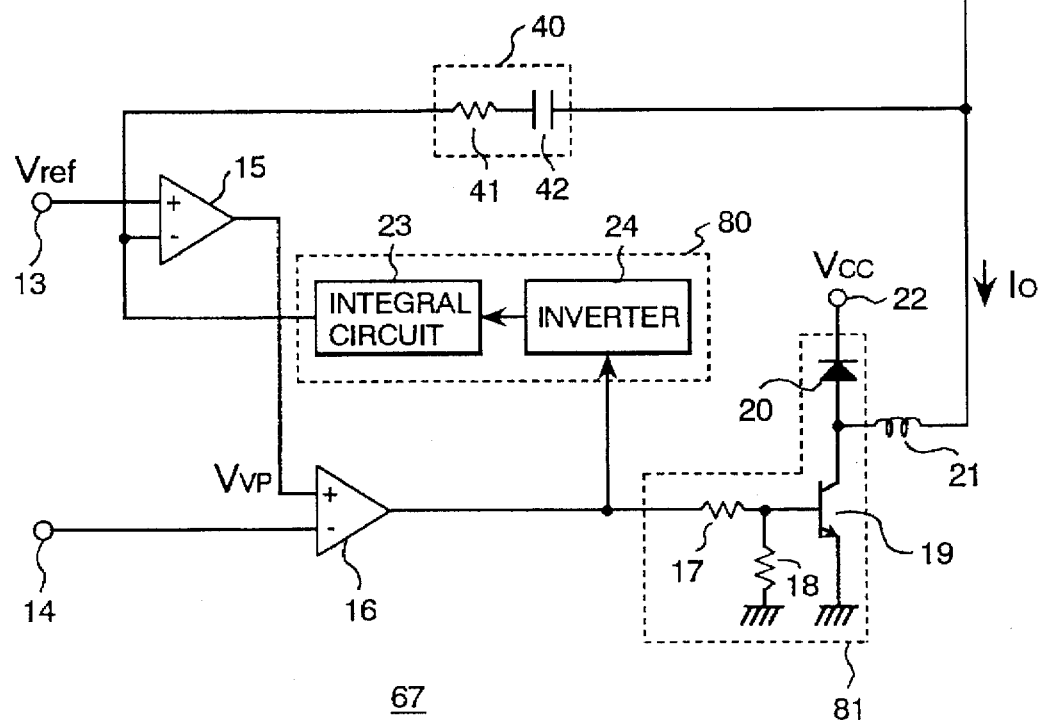

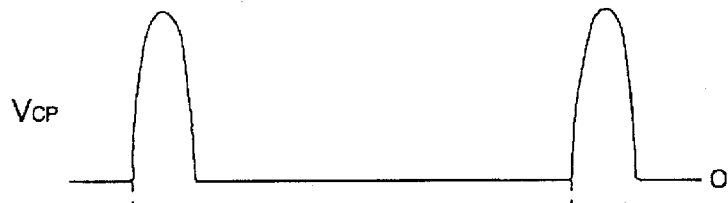
FIG. 11a  $V_{CP}$
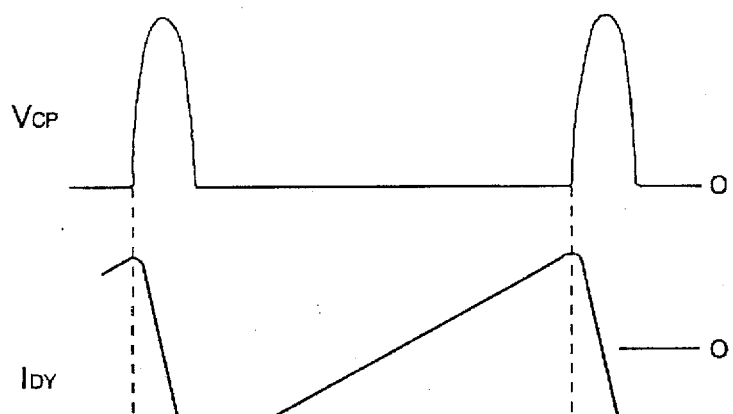
FIG. 11b  $I_{DY}$
FIG. 11c  $V_O$  (SUCCESSIVE MODE)
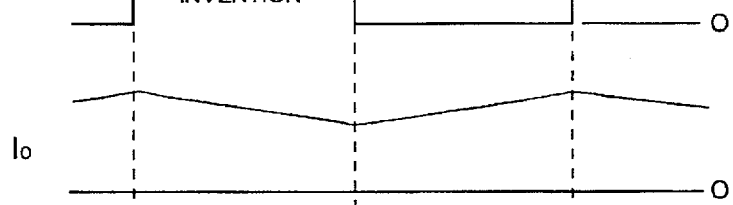
FIG. 11d  $I_O$
FIG. 11e  $V_O$  (INTERMITTENT MODE)
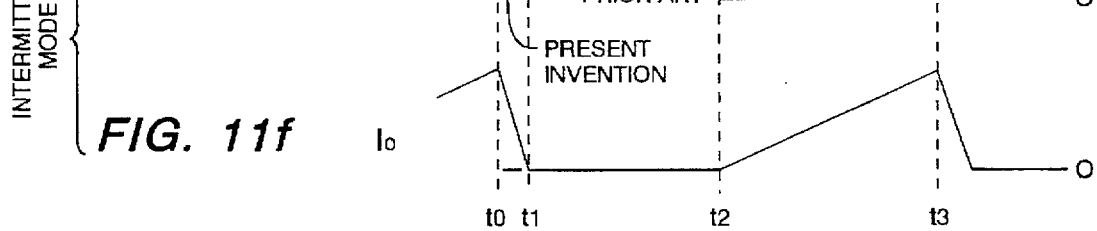
FIG. 11f  $I_O$
t0  t1        t2        t3

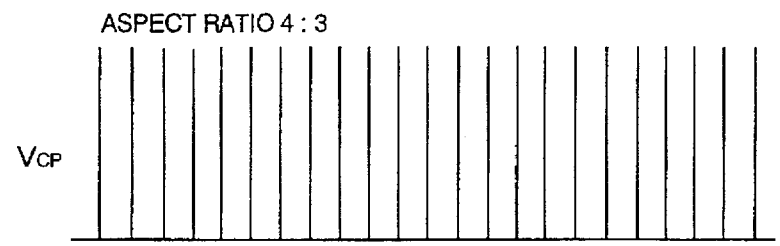
FIG. 12a  V_CP
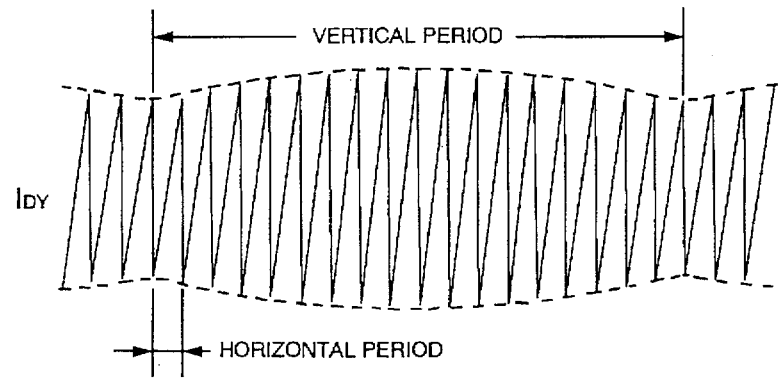
FIG. 12b  I_DY
FIG. 12c  V_CS
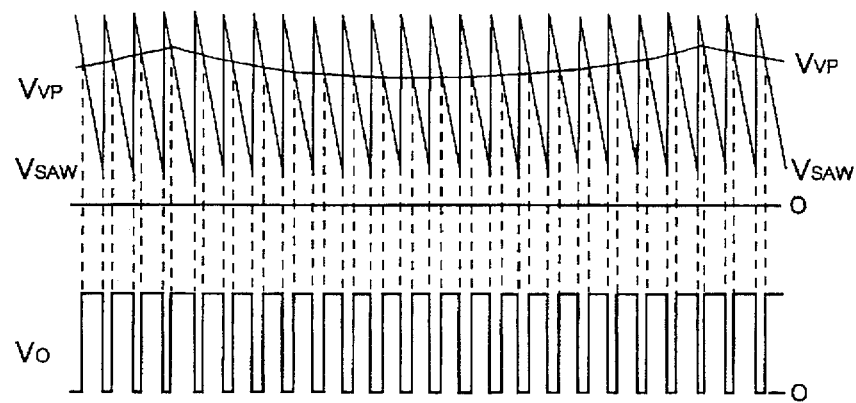
FIG. 12d  V_VP, V_SAW
FIG. 12e  V_O FIG. 13a  $V_{CP}$
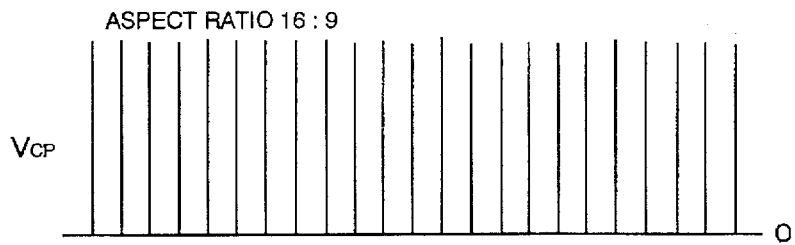
FIG. 13b  $I_{DY}$
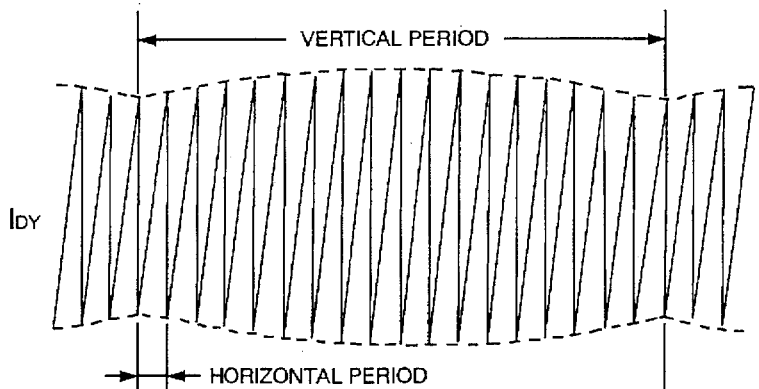
FIG. 13c  $V_{CS}$
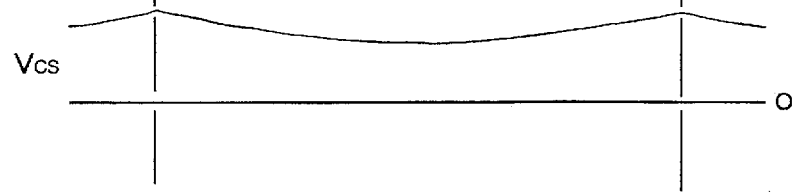
FIG. 13d  $V_{VP}$ $V_{SAW}$
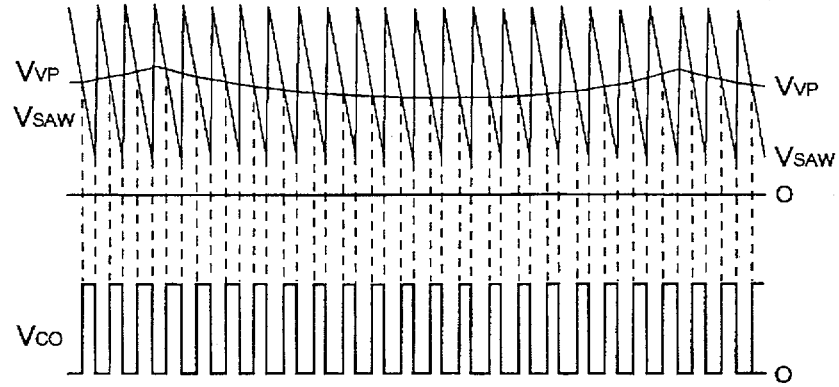
FIG. 13e  $V_{CO}$

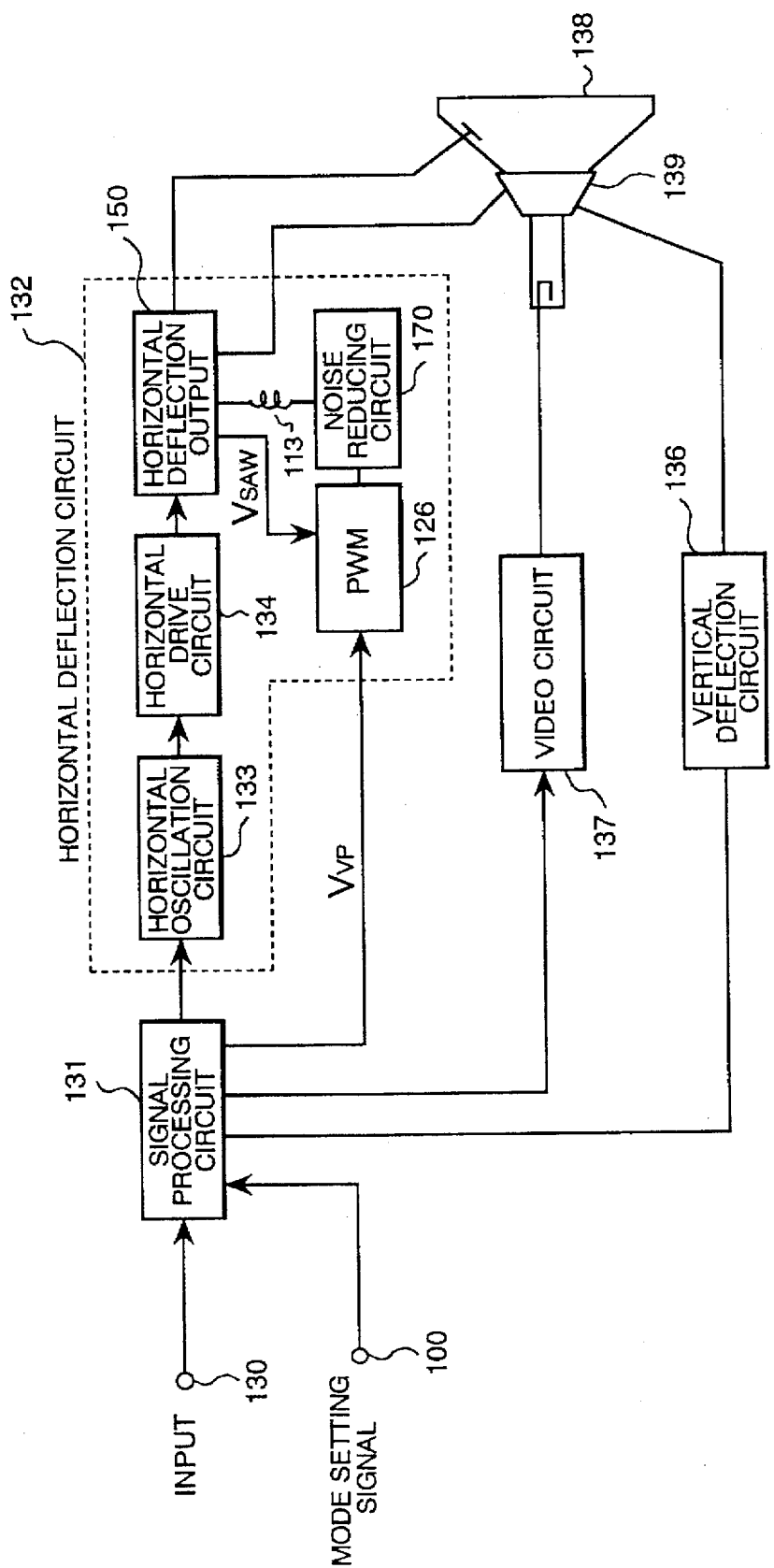

DISPLAY DEVICE

BACKGROUND OF THE INVENTION

The present invention relates to a display device such as a television set (hereinafter referred to as a TV set) or a terminal device of a computer and particularly to a display device using a cathode ray tube having a horizontal deflection circuit for driving a horizontal deflection coil, a vertical deflection circuit for driving a vertical deflection coil, and a video circuit for driving a cathode electrode as a display means.

The screen aspect ratio of a conventional TV set is generally set at 4:3. Recently, however, for the purpose of providing pictures with so much presence, a high definition TV set or a wide TV set having a screen aspect ratio of 16:9 has been introduced. In response to so-called window display for displaying a plurality of pictures at the same time also as a display device for a terminal of a computer, it may be considered effective to set the screen aspect ratio long sideways like a high definition TV set or a wide TV set.

In a display device having a screen aspect ratio which is long sideways like this, to make it possible to display also pictures of the conventional aspect ratio, it may be considered to make it possible to switch the mode for displaying pictures of an aspect ratio of 16:9 and the mode for displaying pictures of the conventional aspect ratio 4:3. As a method of switching the display mode, it may be considered to switch the amplitude of the horizontal deflection current flowing through the horizontal deflection coil according to the respective display mode.

With respect to the actual method of controlling the horizontal deflection current flowing through the horizontal deflection coil, an example thereof is described in Japanese Laid-Open Patent Publication 52-89024. This is a method of controlling the amplitude of a horizontal deflection current by changing the horizontal size control voltage (voltage applied to both ends of the second S-shaped capacitor in a horizontal deflection output circuit) of the horizontal deflection output circuit which is referred to as a diode modulator.

Furthermore, in this conventional example, the power consumption of the circuit is reduced by controlling the aforementioned horizontal size control voltage by a pulse width control circuit using switching.

In the aforementioned prior art, the horizontal size of the screen can be controlled by controlling the amplitude of the horizontal deflection current. This prior art changes the length of horizontal scanning lines on the screen and corrects the horizontal distortion of a picture due to the pincushion distortion by modulating the amplitude of the horizontal deflection current by a parabolic wave of the field frequency, consequently the variation in the length of horizontal scanning lines is a little.

Therefore, even if this prior art is used as it is, it is very difficult to widen the variable range of the horizontal size large enough to stably switch the aspect ratio of pictures from 16:9 to 4:3 or inversely.

It also may be considered that a horizontal deflection circuit is provided for each display mode mentioned above, and a wide variable range of the horizontal size is reserved by switching these horizontal deflection circuits, and a screen of an aspect ratio of 16:9 or 4:3 can be obtained selectively. However, a problem arises that the scale of the horizontal deflection system becomes large.

On the other hand, when the variable range of the horizontal size of the pulse width control circuit is expanded so that pictures of aspect ratios of 16:9 and 4:3 can be switched, a problem arises that noise is generated in the output portion of the pulse width control circuit. In Japanese Laid-Open Patent Publication 52-89024 mentioned above, the problem of the noise generated like this when the variable range of the horizontal size is expanded is not taken into account, and the occurrence amount of such noise in the conventional variable range of the horizontal size is small, and it was not necessary to take a countermeasure for noise also into account.

SUMMARY OF THE INVENTION

An object of the present invention is to eliminate the difficulties of the prior art mentioned above and to provide a display device which can widen the variable range of the horizontal size of the screen so as to switch pictures having greatly different aspect ratios to pictures of aspect ratios of 16:9 and 4:3 without increasing the circuit scale.

Another object of the present invention is to reduce noise Generated in the output portion of the pulse width control circuit.

To accomplish the above object, according to the present invention, the horizontal deflection circuit comprises a horizontal deflection output circuit of a diode modulation type and a pulse width control circuit for outputting a horizontal size control voltage for controlling the amplitude of a horizontal deflection current flowing through the aforementioned horizontal deflection output circuit of a diode modulation type and the pulse width control circuit comprises an error amplifier circuit for inputting a reference voltage for deciding the horizontal size on the display screen and a feedback voltage, a comparator for inputting the output voltage of the error amplifier circuit and a saw tooth wave voltage of the horizontal scanning period, a feedback voltage generation circuit for generating the feedback voltage from the output of the comparator, and a pulse width control output circuit for generating the horizontal size control voltage from the output of the comparator.

The present invention controls the pulse width of a square wave outputted from the comparator on the basis of the horizontal size reference voltage inputted to the error amplifier circuit. The pulse width control output circuit executes switching on the basis of this square wave and controls the modulation voltage of the horizontal deflection output circuit of a diode modulation type. Therefore, the amplitude of a horizontal deflection current flowing through the horizontal deflection coil changes according to the horizontal size reference voltage, consequently the horizontal size can be controlled.

The feedback voltage generation circuit generates a feedback voltage from the output voltage of the comparator and supplies it to the error amplifier circuit. As a result, the pulse width of the output voltage of the comparator can be controlled so as to be set to the predetermined value Without being affected by disturbance of the waveform of the pulse width control output voltage which is generated in the pulse width control output circuit. Therefore, the display device can operate stably for a wide variable range of the horizontal size. As mentioned above, by using the pulse width control circuit, the variable range of the horizontal size of the screen can be widened and pictures of greatly different aspect ratios such as 16:9 and 4:3 can be switched stably.

To accomplish the above object, the display device of the present invention comprises a horizontal deflection circuit for driving a horizontal deflection coil of a deflection yoke, a vertical deflection circuit for driving a vertical deflection coil of the deflection yoke, and a video circuit for driving the cathode of a cathode ray tube, wherein the horizontal deflection circuit has a horizontal deflection output circuit of a diode modulation type and a pulse width control circuit connected to the horizontal deflection output circuit for controlling the amplitude of a horizontal deflection current flowing through the horizontal deflection coil and a noise reducing capacitor and a back flow preventive switching element for preventing a current flowing into the horizontal deflection output circuit from the noise reducing capacitor are connected to the output terminal of the pulse width control circuit.

In this display device, for example, the noise reducing capacitor is connected between the output terminal of the pulse width control circuit and the grounding terminal and the back flow preventive switching element can be connected to a choke coil connected between the output terminal of the pulse width control circuit and the horizontal deflection output circuit in series. A series circuit of the noise reducing capacitor and the back flow preventive switching element can be connected between the output terminal of the pulse width control circuit and the grounding terminal.

In these display devices, the pulse width control circuit preferably comprises a comparator for comparing a horizontal saw tooth wave voltage and a vertical parabolic wave voltage and a transistor for generating a square wave voltage at the output terminal of the pulse width control circuit on the basis of the output of the comparator and the DC bias voltage of the vertical parabolic wave voltage is varied and controlled on the basis of a mode setting signal for switching the aspect ratio. In these display devices, the back flow preventive switching element is, for example, a diode.

According to the present invention, by the operation of the noise reducing capacitor, the rise time of a pulse width control output voltage generated at the output terminal of the pulse width control circuit is made longer. As a result, the high frequency component of a voltage change generated when the pulse width control output voltage rises can be decreased. Therefore, noise caused by unnecessary radiation when the pulse width control output voltage rises can be reduced.

In the display device of the present invention, by the operation of the back flow preventive switching element, a current flowing into the horizontal deflection output circuit from the noise reducing capacitor can be prevented. As a result, an abnormal resonance of the horizontal deflection output circuit caused by connection of the noise reducing capacitor can be suppressed and a distortion generated on the screen can be removed.

BRIEF DESCRIPTION OF THE DRAWINGS

FIGS. 2a–2h is a waveform diagram showing a signal of each portion shown in FIG. 1 for one horizontal scanning period; FIGS. 3a–3e is a waveform diagram showing a signal of each portion shown in FIG. 1 for one vertical scanning period when the aspect ratio is 16:9;

FIGS. 4a–4e is a waveform diagram showing a signal of each portion shown in FIG. 1 for one vertical scanning period when the aspect ratio is 4:3;

FIG. 5 is a drawing showing an actual example of the integrating circuit and the inversion circuit shown in FIG. 1;

FIG. 6 is a drawing showing another actual example of the inversion circuit shown in FIG. 1;

FIG. 7 is a circuit block diagram showing the second embodiment of the display device of the present invention;

FIGS. 11a–11f show operation waveform diagrams for illustrating the operation of the present invention;

FIGS. 12a–12e show operation waveform diagrams for illustrating the operation of the present invention.

FIGS. 13a–13e show operation waveform diagrams for illustrating the operation of the present invention.

FIG. 16 is a block diagram of the whole display device of the present invention.

DETAILED DESCRIPTION OF THE PREFERRED EMBODIMENTS

Figure 1:
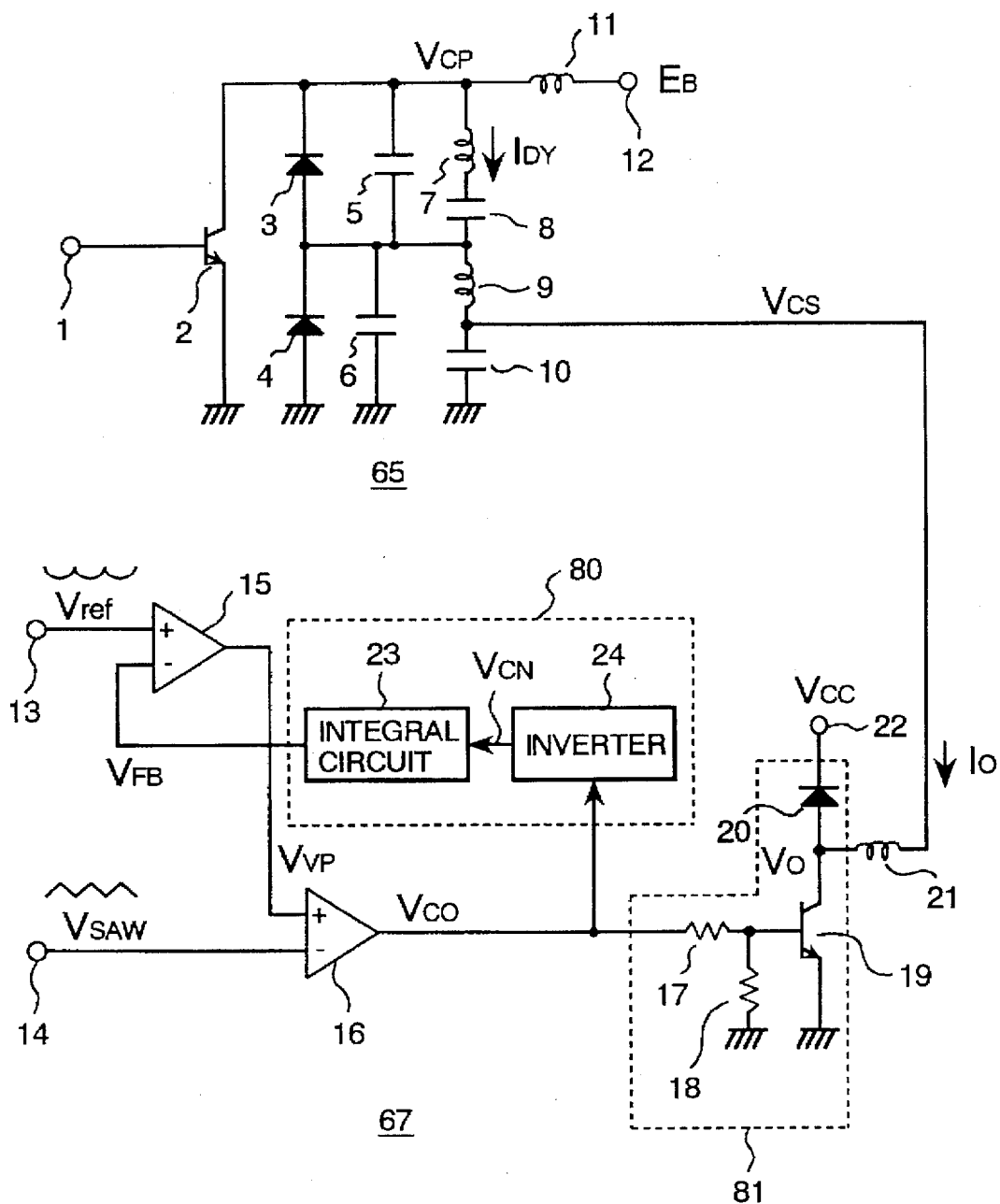
FIG. 1 is a circuit block diagram showing the first embodiment of the display device of the present invention.

The embodiments of the present invention will be explained hereunder with reference to the accompanying drawings. FIG. 1 is a circuit diagram showing the first embodiment of the display device of the present invention. The display device comprises an input terminal 1, a horizontal output transistor 2, a damper diode 3, a modulation diode 4, resonant capacitors 5 and 6, a horizontal deflection coil 7, an S-shaped correction capacitor 8, a modulation coil 9, an S-shaped correction capacitor 10, the primary winding 11 of a horizontal output transformer (or a fly-back transformer), a power supply terminal 12, input terminals 13 and 14, an error amplifier circuit 15, a comparator 16, resistors 17 and 18, a transistor 19, a diode 20, choke coil 21, a power supply terminal 22, an integral circuit 23, an inverter 24, a horizontal deflection output circuit 65, a pulse width control circuit 67, a feedback voltage generation circuit 80, and a pulse width control output circuit 81.

FIG. 2 is a waveform diagram showing a signal of each portion shown in FIG. 1 for one horizontal scanning period. FIG. 3 is a waveform diagram showing a signal of each portion shown in FIG. 1 for one vertical scanning period when the aspect ratio is 16:9. FIG. 4 is a waveform diagram showing a signal of each portion shown in FIG. 1 for one vertical scanning period when the aspect ratio is 4:3.

In FIG. 1, this embodiment comprises the horizontal deflection output circuit of a diode modulation type 65 for supplying a horizontal deflection current $I_{DY}$ to the horizontal deflection coil 7 and the pulse width control circuit 67 for controlling the horizontal deflection current $I_{DY}$.

The horizontal deflection output circuit of a diode modulation type 65 comprises the horizontal output transistor 2, the damper diode 3, the modulation diode 4, the resonant capacitors 5 and 6, the S-shaped correction capacitors 8 and 10, and the modulation coil 9. The pulse width control circuit 67 comprises the error amplifier circuit 15, the comparator 16, the feedback voltage generation circuit 80, and the pulse width control output circuit 81. The feedback voltage generation circuit 80 comprises the integral circuit 23 and the inverter 24 and the pulse width control output circuit 81 comprises the resistors 17 and 18, the transistor 19, and the diode 20.

The collector side of the transistor 19 in the pulse width control output circuit 81 which is an output terminal of the pulse width control circuit 67 is connected between the modulation coil 9 and the S-shaped correction capacitor of the horizontal deflection output circuit 65 via the choke coil 21.

Next, this operation will be explained by referring to FIGS. 1 to 4. In the horizontal deflection output circuit of a diode modulation type 65, the horizontal deflection current $I_{DY}$ flows in the horizontal deflection coil in synchronization with a horizontal drive pulse inputted from the input terminal 1 and when the horizontal deflection current $I_{DY}$ reduces suddenly, a fly-back pulse VCP is generated in the primary winding 11 of the horizontal output transformer (or the fly-back transformer).

In the pulse width control circuit 67, an error output voltage VVP from the error amplifier circuit 15 and a horizontal saw tooth wave voltage VSAW inputted from the input terminal 14 are compared in level by the comparator 16 and a comparison output voltage VCO of a square wave is generated. The comparison output voltage VCO is supplied to the feedback voltage generation circuit 80 and the pulse width control output circuit 81.

In the pulse width control output circuit 81, this comparison output voltage VCO is divided by the resistors 17 and 18 and supplied to the base of the transistor 19 and the transistor 19 performs the switching operation according to the level of the comparison output voltage VCO. By this switching operation, a horizontal size control current IO flowing via the choke coil 21 is controlled and a horizontal size control voltage VCS applied to the S-shaped correction capacitor 10 in the horizontal deflection output circuit of a diode modulation type 65 is controlled.

In the horizontal deflection output circuit of a diode modulation type 65, a voltage applied to both ends of the horizontal deflection coil 7 is controlled by the horizontal size control voltage VCS, consequently the horizontal deflection current $I_{DY}$ is controlled.

On the other hand, in the feedback voltage generation circuit 80 in the pulse width control circuit 67, the comparison output voltage VCO from the comparator 16 is inverted by the inverter 24, and an inversion output voltage VCN is generated, and the inversion output voltage VCN is integrated by the integral circuit 23, and a feedback voltage VFB is generated. The feedback voltage VFB is supplied to the error amplifier circuit 15 together with a horizontal size reference voltage Vref from the input terminal 13. If there is a level difference between them, the level of the error output voltage VVP from the error amplifier circuit 15 changes and a feedback is applied so that a relation of a fixed level is established between the feedback voltage VFB and the horizontal size reference voltage Vref (for example, both become equal to each other). As a result, the pulse width of the comparison output voltage VCO from the comparator 16 can be controlled on the basis of the horizontal size reference voltage Vref inputted to the error amplifier circuit 15.

By the aforementioned operation, the horizontal deflection current I can be controlled by the horizontal size reference voltage Vref, consequently pictures of aspect ratios of 16:9 and 4:3 can be switched by changing the DC voltage of the horizontal size reference voltage Vref. By modulating the horizontal size reference voltage Vref in a parabolic state of the vertical scanning period, a side pin correction can be executed.

A difference of this embodiment from the art described in Japanese Patent Application Laid-Open 52-89024 is that a negative feedback circuit comprising the error amplifier circuit 15 and the feedback voltage generation circuit 80 is provided. As a result, the display device can operate stably for variations of the horizontal size in a wide range. This character will be explained hereunder more in detail.

To widen the horizontal size control range in the pulse width control circuit 67, it is necessary to increase the supply voltage VCC of the pulse width control output circuit 81 and to increase the variation of the horizontal size control voltage VCS against a change of the pulse width of the comparison output voltage VCO from the comparator 16.

In this case, if the aforementioned negative feedback circuit comprising the error amplifier circuit 15 and the feedback voltage generation circuit 80 is not provided (namely, by the method of supplying the horizontal size reference voltage Vref directly to the comparator 16 which is described in Japanese Laid-Open Patent Publication 52-89024), the display device is more easily affected by changes in the amplitude of the horizontal saw tooth wave voltage VSAW and the DC bias voltage. Since the amplitude of the horizontal saw tooth wave voltage VSAW and the DC bias voltage are changed due to variations in the ambient temperature and parts used, the horizontal size is changed more greatly.

On the other hand, in this embodiment, by the operation of the aforementioned negative feedback circuit comprising the error amplifier circuit 15 and the feedback voltage generation circuit 80, effects by variations of the amplitude of the horizontal saw tooth wave voltage VSAW and the DC bias voltage due to variations in the ambient temperature and parts can be decreased and variations in the pulse width of the comparison output voltage VC0 from the comparator 16 can be decreased. Therefore, even if the supply voltage VCC of the pulse width control output circuit 81 is increased so as to widen the horizontal size control range, the horizontal size control voltage VCS can be controlled stably.

Furthermore, another characteristic of this embodiment is that the feedback voltage VFB to the error amplifier circuit 15 is generated by using the comparison output voltage VCO from the comparator 16. Concretely, in the feedback voltage generation circuit 80, the comparison output voltage VCO from the comparator 16 is inverted and integrated and the feedback voltage VFB to the error amplifier circuit 15 is generated. To generate the feedback voltage VFB, a method of using the pulse width control voltage VO from the pulse width control output circuit 81 also may be considered. However, when the pulse width control voltage VO is used, a problem arises that the display device malfunctions due to disturbance of the waveform of the pulse width control voltage VO. This malfunction will be explained more in detail hereunder by referring to FIG. 2.

As mentioned above, to expand the horizontal size control range so as to switch pictures of aspect ratios of 16:9 and 4:3, it is necessary to increase the supply voltage VCC of the pulse width control output circuit 81 in FIG. 1. However, if the supply voltage VCC is increased like this, a fixed period in the horizontal scanning period during which the horizontal size control current IO flowing via the choke coil 21 becomes almost 0 is generated. Such an operation mode is generally referred to as a discontinuous mode.

The solid line shown in FIG. 2e and the solid line shown in FIG. 2h show the pulse width control voltage Vo and the horizontal size control current IO in the discontinuous mode respectively. FIG. 2e shows that the pulse width control voltage Vo has a unique waveform disturbance in the discontinuous mode and does not become a square wave.

On the other hand, the general operation mode in which the horizontal size control current IO is always larger than 0 is referred to as a continuous mode. The operation waveforms of the pulse width control voltage Vo and the horizontal size control current IO when it is assumed that the display device is in the continuous mode are shown by a dotted line VO' shown in FIG. 2e and a dotted line IO' shown in FIG. 2h. In this case, the waveform of the pulse width control voltage VO' is a square wave.

In FIG. 2e, when the waveform of the pulse width control voltage VO shown by a solid line in the discontinuous mode is compared with the waveform of the pulse width control voltage VO' shown by a dotted line in the continuous mode, the waveform of the pulse width control voltage VO in the discontinuous mode has a smaller amount of integration in the horizontal scanning period. Therefore, when the feedback voltage VFB is generated by using the pulse width control voltage VO in the discontinuous mode, a voltage lower than the voltage which is required originally is supplied to the error amplifier circuit 15 as a feedback voltage VFB. As a result, the error amplifier circuit 15 operates so that the pulse width Tw1 (FIG. 2d) of the comparison output voltage VCO from the comparator 16 becomes smaller. Therefore, the pulse width Tw0 (FIG. 2e) of the pulse width control voltage VO extends, and the horizontal size control voltage VCS increases, and the amplitude of the horizontal deflection current I decreases. As a result, the amplitude of the horizontal deflection current I becomes smaller than the value set on the basis of the horizontal size reference voltage Vref and the horizontal size becomes insufficient.

On the other hand, in the first embodiment, the feedback voltage VFB is generated by processing the comparison output voltage VCO from the comparator 16 by the feedback voltage generation circuit 80. Namely, in the feedback voltage generation circuit 80, the inversion output voltage VCN (FIG. 2f) is generated by inverting the comparison output voltage VCO from the comparator 16 by the inverter 24 and the feedback voltage VFB is generated by integrating the inversion output voltage VCN. Even if the pulse width control voltage VO is disturbed in the aforementioned discontinuous mode, the inversion output voltage VCN is not adversely affected by it but always kept in the stable square waveform. Therefore, even if a discontinuous mode is generated when the horizontal size variable range is widened, the feedback voltage VFB can be reserved as specified, and the horizontal size can be controlled to a value set on the basis of the horizontal size reference voltage Vref, and an insufficient horizontal size will not be generated as mentioned above. As mentioned above, in the first embodiment, the horizontal size control range can be widened stably.

FIG. 5 is a circuit diagram showing an actual circuit constitution of the integral circuit 23 and the inverter 24 shown in FIG. 1. The integral circuit 23 includes a capacitor 25, a resistor 26. The inverter 24 includes a comparator 27, resistors 28 and 29, and a power supply terminal 90. The same numeral is assigned to each part corresponding to those shown in FIG. 1 so as to omit duplicated explanation.

In the inverter 24, a supply voltage VC1 from the power supply terminal 90 is divided by the resistors 28 and 29 so as to generate the predetermined reference voltage and this reference voltage becomes a non-inverted input of the comparator 27. The non-inverted input of the comparator 27 is the comparison output voltage VCO from the comparator 16. By doing this, the inversion output voltage VCN which is obtained by inverting the comparison output voltage VCO is obtained from the comparator 27. The inversion output voltage VCN is integrated by the integral circuit 23 comprising the resistor 26 and the capacitor 25 and the feedback voltage VFB is obtained.

FIG. 6 is a circuit diagram showing another actual circuit constitution of the integral circuit 23 and the inverter 24 shown in FIG. 1. The inverter includes a transistor 30, resistors 31 to 33. The same numeral is assigned to each part corresponding to those shown in FIG. 5 so as to omit duplicated explanation.

The inverter 24 is an inversion amplifier circuit comprising the resistors 31 to 33 and the transistor 30 and the comparison output voltage VCO from the comparator 16 is divided by the resistors 32 and 33 and supplied to the base of the transistor 30. When the comparison output voltage VCO is on the high level, the collector of the transistor 30 is on the low level and when the comparison output voltage VCO is on the low level, the collector of the transistor 30 is on the high level. Therefore, in the collector of the transistor 30, a voltage which is generated by inverting the comparison output voltage VCO is obtained and it is supplied to the integral circuit 23 as an inversion output voltage VCN. This integral circuit 23 has the same circuit constitution as that of the integral circuit 23 shown in FIG. 5.

FIG. 7 is a circuit block diagram showing the second embodiment of the display device of the present invention. The device includes a horizontal size variation correction circuit 40, a resistor 41, a capacitor 43, a fly-back transformer 91, a diode 92, and an anode terminal 93 of a cathode ray tube (CRT, not shown in the drawing) and the same numeral is assigned to each part corresponding to those shown in FIG. 1 so as to omit duplicated explanation.

As shown in FIG. 7, a difference of this second embodiment from the first embodiment shown in FIG. 1 is that the horizontal size variation correction circuit 40 is installed between the connection point between the S-shaped correction capacitor 10 and the choke coil 21 and the inversion input terminal of the error amplifier 15. The horizontal size variation correction circuit 40 is a series circuit of the resistor 41 and the capacitor 42.

The operation and function of the horizontal size variation correction circuit 40 will be explained hereunder.

The circuit having the constitution shown in FIG. 7 is generally called a horizontal deflection high-voltage integrated circuit and drives the horizontal deflection coil 7 and the fly-back transformer 91 by one horizontal output transistor 2 in the horizontal deflection output circuit 65. When a beam current Ib flows from the fly-back transformer 91 in this circuit, a high voltage EHV generated at the anode terminal 93 of the cathode ray tube drops, consequently the horizontal size is increased while the beam current Ib is flowing.

On the other hand, at the same time with flow of the beam current Ib, so as to replenish energy lost in the fly-back transformer 91, a supply current IEB flowing into the primary winding 11 of the fly-back transformer 91 from the power supply terminal 12 to which a supply voltage EB is applied is increased. In the horizontal deflection output circuit of a diode modulation type 65, this change in the supply current IEB also affects the horizontal size control current IO. Namely, the horizontal size control current IO also increases as the supply current IEB increases. Therefore, the voltage applied to both ends of the choke coil 21 also increases and the horizontal size control voltage VCS. As a result, the horizontal deflection current I decreases and the horizontal size of the screen decreases. This variation depends on the inductance L of the choke coil 21 and as the inductance L increases, the horizontal size decreases much the more.

As mentioned above, when the beam current Ib flows, a state that a factor for increasing the horizontal size and a factor for decreasing the horizontal size coexist is generated. By adjusting the inductance L of the choke coil 21 so as to cancel these two factors each other, the horizontal size can be minimized in variation.

However, the inductance L of the choke coil 21 is generally set so that the power consumption of the circuit and costs of parts are given priority and it is very difficult to adjust the inductance L of the choke coil 21 as mentioned above. Therefore, as the beam current Ib changes, the horizontal size changes.

Therefore, in the second embodiment, as shown in FIG. 7, the horizontal size variation correction circuit 40 is installed. By doing this, the horizontal size is corrected and a variation in the horizontal size corresponding to a variation in the beam current Ib is decreased.

Namely, the horizontal size variation correction circuit 40 detects a variation in the horizontal size control voltage VCS due to a variation in the beam current Ib and feeds back the variation of the horizontal size control voltage VCS to the error amplifier circuit 15. As a result, the error output voltage VVP from the error amplifier circuit 15 which is to be supplied to the comparator 16 is controlled so as to decrease a variation in the horizontal size control voltage VCS.

By overlapping a voltage corresponding to a change in the beam current Ib with the horizontal size reference voltage Vref inputted from the input terminal 13, it is possible to finely adjust the horizontal size control voltage VCS and reduce a variation in the horizontal size much the more.

As mentioned above, in the second embodiment, in addition to the effect of the first embodiment mentioned above, an effect that a variation in the horizontal size due to a change in the beam current Ib can be reduced much the more is produced.

Also in this second embodiment, needless to say, the constitution of the inverter 24 and the integral circuit 23 can be made similar to the circuit constitution shown in FIGS. 5 and 6 in the same way as with the first embodiment shown in FIG. 1.

Figure 8:
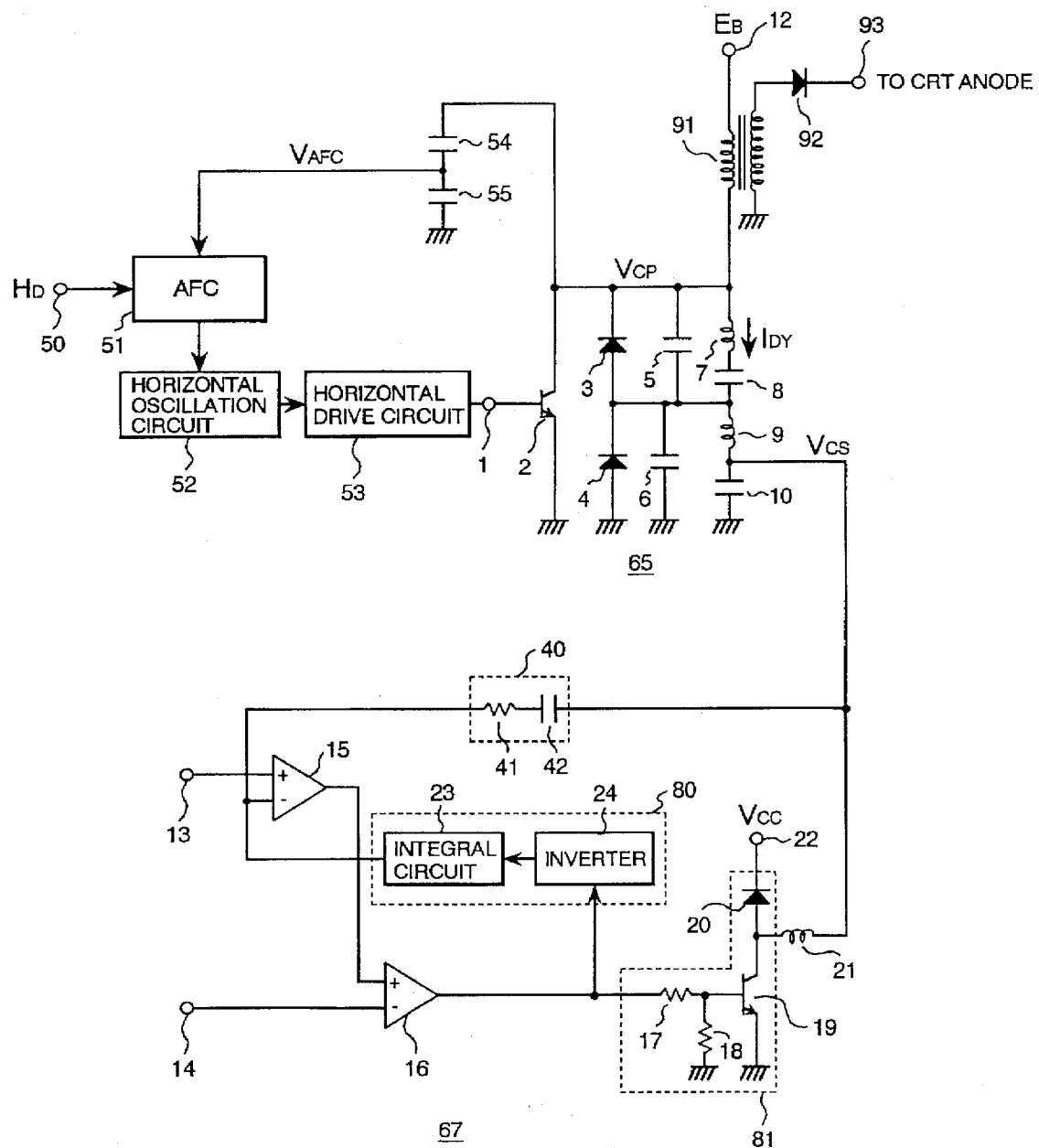
FIG. 8 is a circuit block diagram showing the third embodiment of the display device of the present invention.

FIG. 8 is a block diagram showing the third embodiment of the display device of the present invention. The device includes input terminal 50, a horizontal AFC circuit 51, a horizontal oscillation circuit 52, a horizontal drive circuit 53, and capacitors 54 and 55. The same numeral is assigned to each part corresponding to those shown in FIG. 7 so as to omit duplicated explanation.

In the drawing, a horizontal synchronizing signal HD inputted from the input terminal 50 is compared with a feedback voltage VAFC by the horizontal AFC circuit 51 and the oscillation frequency of the horizontal oscillation circuit 52 is controlled according to the error voltage thereof. The output of the horizontal oscillation circuit 52 is supplied to the horizontal drive circuit 53 so as to generate a horizontal drive pulse and it is supplied to the base of the horizontal output transistor 2 in the horizontal deflection output circuit 65 from the input terminal 1.

A difference of this third embodiment from the second embodiment of the present invention shown in FIG. 7 is that the fly-back pulse VCP generated at the output terminal of the horizontal output transistor 2 in the horizontal deflection output circuit 65 is used as a feedback voltage VAFC to be fed back to the horizontal AFC circuit 51.

Generally, a third winding is provided in the fly-back transformer 91 and the output voltage of this third winding is used as a feedback voltage VAFC. In this case, the feedback voltage VAFC is apt to be affected by a waveform distortion due to the beam current Ib and when the feedback voltage VAFC changes in correspondence to a change in the beam current Ib, the operation of the horizontal AFC circuit 51 is disturbed and a laterally asymmetrical distortion is generated on the screen. Particularly when a picture of an aspect ratio of 4:3 is displayed on a cathode ray tube of an aspect ratio of 16:9, both the right and left ends of the picture are displayed within the screen, so that this laterally asymmetrical distortion is more conspicuous. When a picture of an aspect ratio of 4:3 is displayed on a cathode ray tube of an aspect ratio of 4:3, the laterally asymmetrical distortion can be made inconspicuous by overscanning.

On the other hand, in the third embodiment, as shown in FIG. 8, the fly-back pulse VCP generated at the output terminal of the horizontal output transistor 2 is divided by the capacitors 54 and 55 and used as a feedback voltage VAFC of the AFC circuit 51. By doing this, a variation of the feedback voltage VAFC due to a change in the beam current Ib can be decreased compared with a case that the feedback voltage VAFC is generated from the third winding of the fly-back transformer 91 and the laterally asymmetrical distortion due to a change in the beam current Ib is decreased.

As mentioned above, in the third embodiment, in addition to the effects of the first and second embodiments mentioned above, an effect that the laterally asymmetrical distortion due to a change in the beam current Ib can be decreased is produced.

In this third embodiment, the capacitors 54 and 55 are used so as to divide the fly-back pulse VCP. However, other impedance parts (for example, a coil or resistor) may be used and the same effect can be produced.

Also in this third embodiment, needless to say, the constitution of the inverter 24 and the integral circuit 23 can be made similar to the circuit constitution shown in FIGS. 5 and 6 in the same way as with the first embodiment shown in FIG. 1.

Figure 9:
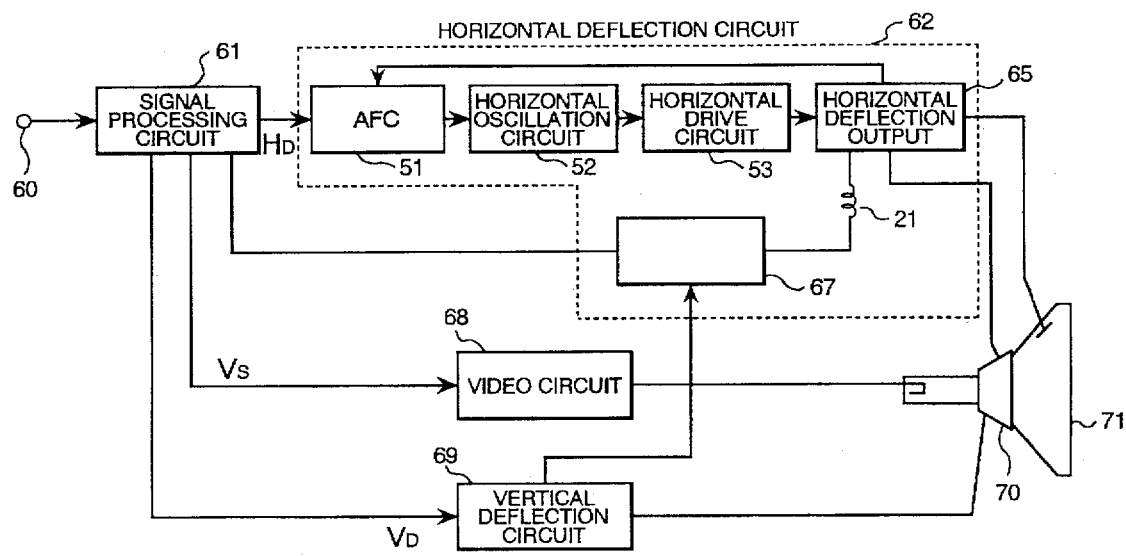
FIG. 9 is a block diagram showing the whole constitution of the display device of the present invention.

FIG. 9 is a block diagram showing the whole constitution of the display device of the present invention. The device includes input terminal 60, a signal processing circuit 61, a horizontal deflection circuit 62, a video circuit 68, a vertical deflection circuit 69, a deflection yoke 70, and a cathode ray tube 71. Each part corresponding to that shown in the previous drawing is assigned the same reference numeral.

In the drawing, the horizontal deflection circuit 62 has the same constitution as that shown in FIGS. 1 and 5 to 8. A composite video signal inputted from the input terminal 60 is supplied to the signal processing circuit 61 and processed as specified and separated into a video signal VS, a horizontal synchronizing signal HD, and a vertical synchronizing signal VD. The video signal VS is processed by the video circuit 68 so as to drive the cathode electrode of the cathode ray tube 71. The horizontal synchronizing signal HD is supplied to the horizontal deflection circuit 62, and a horizontal deflection current is generated in the horizontal deflection output circuit 65, and the deflection yoke 70 of the cathode ray tube 71 is driven by it. In this horizontal deflection output circuit 65, a high voltage is generated from the output of the horizontal output transformer (or the fly-back transformer) and supplied to the anode of the cathode ray tube 71. The vertical synchronizing signal VD is supplied to the vertical deflection circuit 69, and a vertical deflection current is generated, and the deflection yoke 70 of the cathode ray tube 70 is driven by it.

In the signal processing circuit 61, the aspect ratio of the inputted composite video signal is detected, and the aforementioned horizontal size reference voltage Vref in correspondence to the detected aspect ratio is generated, and a horizontal saw tooth wave voltage VSAW is also generated from the separated horizontal synchronizing signal HD, and they are supplied to the pulse width control circuit 67 respectively.

Furthermore, as explained previously, when the horizontal size reference voltage Vref is modulated in a parabolic state in the vertical scanning period and a side pin [page 16] correction is executed, it is desirable to generate a parabolic voltage in the vertical scanning period in the vertical deflection circuit 69 and modulate the amplitude of the horizontal size reference voltage Vref at the parabolic voltage in the pulse width control circuit 67.

The fourth embodiment of the present invention will be explained by referring to FIG. 10. The display system shown in FIG. 10 includes a horizontal drive pulse input terminal 101, a horizontal output element 102, a damper diode 103, a modulation diode 104, a first resonant capacitor 105, a second resonant capacitor 106, a horizontal deflection coil 107, a first S-shaped capacitor 108, a modulation coil 109, a second S-shaped capacitor 110, the primary winding of a horizontal output transformer 111 (or the primary winding of a fly-back transformer), a supply voltage EB input terminal 112, a choke coil 113, a horizontal saw tooth wave voltage input terminal 115, a vertical parabolic wave voltage input terminal 116, a comparator 117, capacitors 118 and 161, resistors 119,120 and 160, a transistor 121, a back flow preventive switching element 122, a noise reducing capacitor 123, a diode 124, a supply voltage Vcc terminal 125, a pulse width control circuit 126, and a horizontal deflection output circuit 150.

Figure 10:
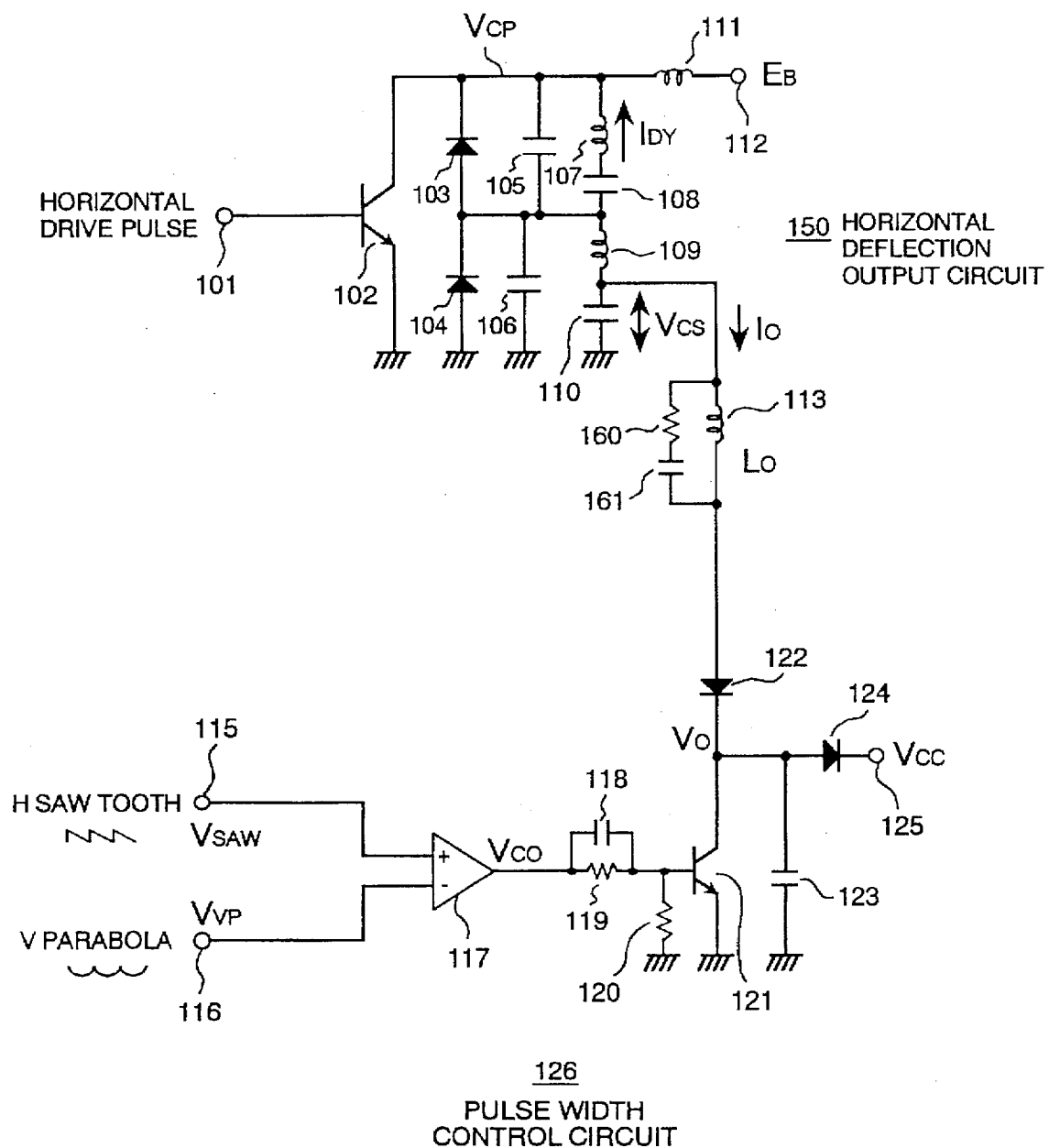
FIG. 10 is a drawing showing the fourth embodiment of the present invention.

In FIG. 10, a symbol Vcp indicates a fly-back pulse generated at the output terminal of the horizontal output element 102, a horizontal deflection current $I_{DY}$ flowing through the horizontal deflection coil 107, Vcs a voltage applied to the second S-shaped capacitor 110, Vo a pulse width control output voltage, Vco an output voltage of the comparator 117, VSAW a horizontal saw tooth wave voltage, Vvp a vertical parabolic wave voltage, and Io a current flowing via the choke coil 113.

In FIG. 10, the comparator 117, the capacitor 118, the resistors 119 and 120, the transistor 121, and the diode 124 constitute the pulse width control circuit 126. The horizontal output element 102, the damper diode 103, the modulation diode 104, the first resonant capacitor 105, the second resonant capacitor 106, the horizontal deflection coil 107, the first S-shaped capacitor 108, the modulation coil 109, and the second S-shaped capacitor 110 constitute the horizontal deflection output circuit of a diode modulation type 150.

The operations of the circuits shown in FIG. 10 will be explained hereunder by referring to the operation wave diagrams shown in FIGS. 11, 12, and 13. The pulse width control circuit 126 shown in FIG. 10 generates the square wave voltage Vco by comparing the horizontal saw tooth wave voltage VSAW inputted from the horizontal saw tooth wave voltage input terminal 115 and the vertical parabolic wave voltage Vvp inputted from the vertical parabolic wave voltage input terminal 116. The transistor 121 shown in FIG. 10 performs the switching operation on the basis of the square wave voltage Vco outputted from the comparator 117. As a result, the pulse width control circuit 126 can control the voltage Vcs applied to the second S-shaped capacitor 110 by changing the current Io flowing via the choke coil 113.

The horizontal deflection output circuit of a diode modulation type 150 controls the voltage applied to the horizontal deflection coil 107 by the voltage Vcs applied to the second S-shaped capacitor 110 and controls the horizontal deflection current $I_{DY}$.

Therefore, the circuit shown in FIG. 10 modulates the horizontal deflection current $I_{DY}$ in a parabolic state of the vertical period on the basis of the vertical parabolic wave voltage Vvp inputted from the vertical parabolic wave voltage input terminal 116 and can execute a side pin correction. The circuit changes the amplitude of the horizontal deflection current $I_{DY}$ by changing the bias voltage of the vertical parabolic wave voltage Vvp inputted from the vertical parabolic wave voltage input terminal 116 and can control the horizontal size. Therefore, by changing the bias voltage of the vertical parabolic wave voltage Vvp, pictures of the aforementioned aspect ratios of 16:9 and 4:3 can be switched.

To switch the aspect ratios of 16:9 and 4:3 like this, it is necessary to increase the amplitude of the pulse width control output voltage Vo and widen the variable range of the voltage Vcs against a change in the pulse width of the pulse width control output voltage Vo. Concretely, by increasing the supply voltage Vcc applied to the terminal of supply voltage Vcc 125, the amplitude of the pulse width control output voltage Vo is increased.

In this case, unnecessary radiation generated when the pulse width control output voltage Vo rises increases as the amplitude of the pulse width control output voltage Vo expands. A problem arises that vertical stripe noise is generated in the adjacent display device by this increase of unnecessary radiation.

On the other hand, in the display device of the present invention, the rise time of the pulse width control output voltage Vo is prolonged by the operation of the noise reducing capacitor 123. As a result, the high frequency component of a change of the voltage generated when the pulse width control output voltage Vo rises can be decreased. The cause of the aforementioned vertical stripe noise generated in the adjacent display device is mostly the high frequency component of a change of the voltage generates when the pulse width control output voltage Vo rises. Therefore, by decreasing the high frequency component of a change of the voltage generated when the pulse width control output voltage Vo rises, the aforementioned vertical stripe noise generated in the adjacent display device can be reduced.

However, when the noise reducing capacitor 123 is just connected between the collector and the emitter of the transistor 121 shown in FIG. 10 (when the back flow preventive switching element 122 is always short-circuited), an abnormal resonance is generated in the horizontal deflection output circuit 150. Concretely, when the noise reducing capacitor 123 is connected, the voltage Vcs applied to the second S- shaped capacitor 110 is overlapped with a resonance voltage of a frequency of about 500 Hz to 2 kHz and the horizontal deflection current $I_{DY}$ is also modulated at the same frequency. In correspondence to it, the horizontal size on the screen also varies and a screen distortion appears.

Therefore, in the display device of the present invention, the back flow preventive switching element 122 shown in FIG. 10 is used to prevent the horizontal deflection output circuit 150 from being affected by the noise reducing capacitor 123. Concretely, although a current flows into the pulse width control circuit 126 from the horizontal deflection output circuit 150 by the operation of the back flow preventive switching element 122, it is designed that no current flows into the horizontal deflection output circuit 150 from the pulse width control circuit 126. As a result, it is possible to flow only the current Io necessary to control the horizontal size in the choke coil 113 and prevent a current flowing into the choke coil 113 via the noise reducing capacitor 123 which is the cause of the aforementioned abnormal resonance. By the operation of the back flow preventive switching element 122, the abnormal resonance in the horizontal deflection output circuit 150 generated when the noise reducing capacitor 123 is connected can be eliminated.

The series circuit comprising the resistor 160 and the capacitor 61 connected in parallel with the choke coil 113 shown in FIG. 10 functions to reduce ringing (voltage vibration) generated at both ends of the choke coil 113 when the back flow preventive switching element 122 is cut off. In the circuit shown in FIG. 10, a diode is used for the back flow preventive switching element 122. However, a switch element such as a transistor switch or a triode AC switch may be used in place of the diode so as to control the conduction period.

FIG. 11 shows operation waveforms when the operation of the circuit shown in FIG. 10 with the aspect ratio kept constant is observed in the horizontal period. In FIG. 11a indicates the fly-back pulse Vcp, FIG. 11b the horizontal deflection current I, FIG. 11c the pulse width control output voltage Vo in the continuous mode, and FIG. 11d the current Io flowing through the choke coil 113 in the continuous mode. "Continuous mode" mentioned above means an operation when the inductance Lo of the choke coil 113 is made large enough so that the current Io flowing through the choke coil 113 is always kept larger than the OA.

In FIG. 11, in a conventional display device not using the noise reducing capacitor 123 and the back flow preventive switching element 122 shown in FIG. 10, the waveform of the pulse width control output voltage Vo is made so that the leading edge of the voltage is steep and the rise time is short as shown by a solid line in FIG. 11c. As a result, as mentioned above, it includes a large amount of high frequency component which is the cause of vertical stripe noise given to the adjacent display device. On the other hand, in the display device of the present invention using the noise reducing capacitor 123 and the back flow preventive switching element 122, the waveform of the pulse width control output voltage Vo is made so that the leading edge of the voltage is gentle and the rise time is longer as shown by a dashed line in FIG. 11c. Therefore, the high frequency component which is the cause of vertical stripe noise given to the adjacent display device can be reduced.

On the other hand, FIG. 11e shows a waveform of the pulse width control output voltage Vo in the discontinuous mode, and the solid line indicates the conventional operation waveform, and the dashed line shows an operation waveform of the display device of the present invention using the noise reducing capacitor 123 and the back flow preventive switching element 22. FIG. 11f shows the current Io flowing through the choke coil 113 in the discontinuous mode. "Discontinuous mode" mentioned above means an operation when the inductance Lo of the choke coil 113 is decreased so that the current Io flowing through the choke coil 13 is kept at the OA for a fixed period of time. Even in this discontinuous mode, in the display device of the present invention, by the operation of the noise reducing capacitor 123 and the back flow preventive switching element 122, the high frequency component which is the cause of vertical stripe noise given to the adjacent display device can be reduced.

Between the time t1 and the time t2 shown in FIG. 11e, the operation waveform of the pulse width control output voltage Vo is different between the conventional case indicated by the solid line and the case of the present invention indicated by the dashed line. The reason is that in the display device of the present invention, by the operation of the back flow preventive switching element 122 shown in FIG. 10, the charge accumulated in the noise reducing capacitor 123 is retained while the transistor 121 is off (between the t1 and the time t2).

The present invention can use any of the continuous mode and the discontinuous mode. However, from a viewpoint of pulse width control, the continuous mode is general and generates little noise. However, if it is attempted to widen the horizontal size control range forcibly when the continuous mode is used, it is necessary to set the inductance of the choke coil 113 to 20 mH or more and there is a possibility of an increase of cost. On the other hand, in the discontinuous mode, the horizontal size control range can be expanded at an inductance of 1 mH or less of the choke coil 113 and the cost can be lowered. Although noise generated in the discontinuous mode is high, the problem can be solved by the present invention. Therefore, it can be said that the discontinuous mode is advantageous for a wide television set.

FIGS. 12 and 13 show operation waveforms when the operation of the circuit shown in FIG. 10 is observed in the vertical period and the aspect ratio shown in FIG. 12 is 4:3 and the aspect ratio shown in FIG. 13 is 16:9. In FIGS. 12a and 13a indicate the fly-back pulse Vcp, FIGS. 12b and 13b the horizontal deflection current $I_{DY}$, FIGS. 12c and 13c the voltage Vcs applied to the fifth S-shaped capacitor 10, FIGS. 12d and 13d the vertical parabolic wave voltage Vvp and the horizontal saw tooth wave voltage VSAW, and FIGS. 12e and 13e the pulse width control output voltage Vo.

In the circuit shown in FIG. 10, by changing the DC bias voltage of the vertical parabolic wave voltage Vvp, the pulse width of the pulse width control output voltage Vo is changed and the voltage Vcs applied to the fifth S-shaped capacitor 10 is controlled. As a result, the amplitude of the horizontal deflection current $I_{DY}$ can be set in correspondence to the aspect ratios of 4:3 and 16:9 respectively.

Next, the fifth embodiment of the present invention will be explained by referring to FIG. 14. The circuit shown in FIG. 14 is different from the fourth embodiment of the present invention shown in FIG. 10 in the connection method of the noise reducing capacitor 123 and the back flow preventive switching element 122 and the connection of a resistor 128.

Figure 14:
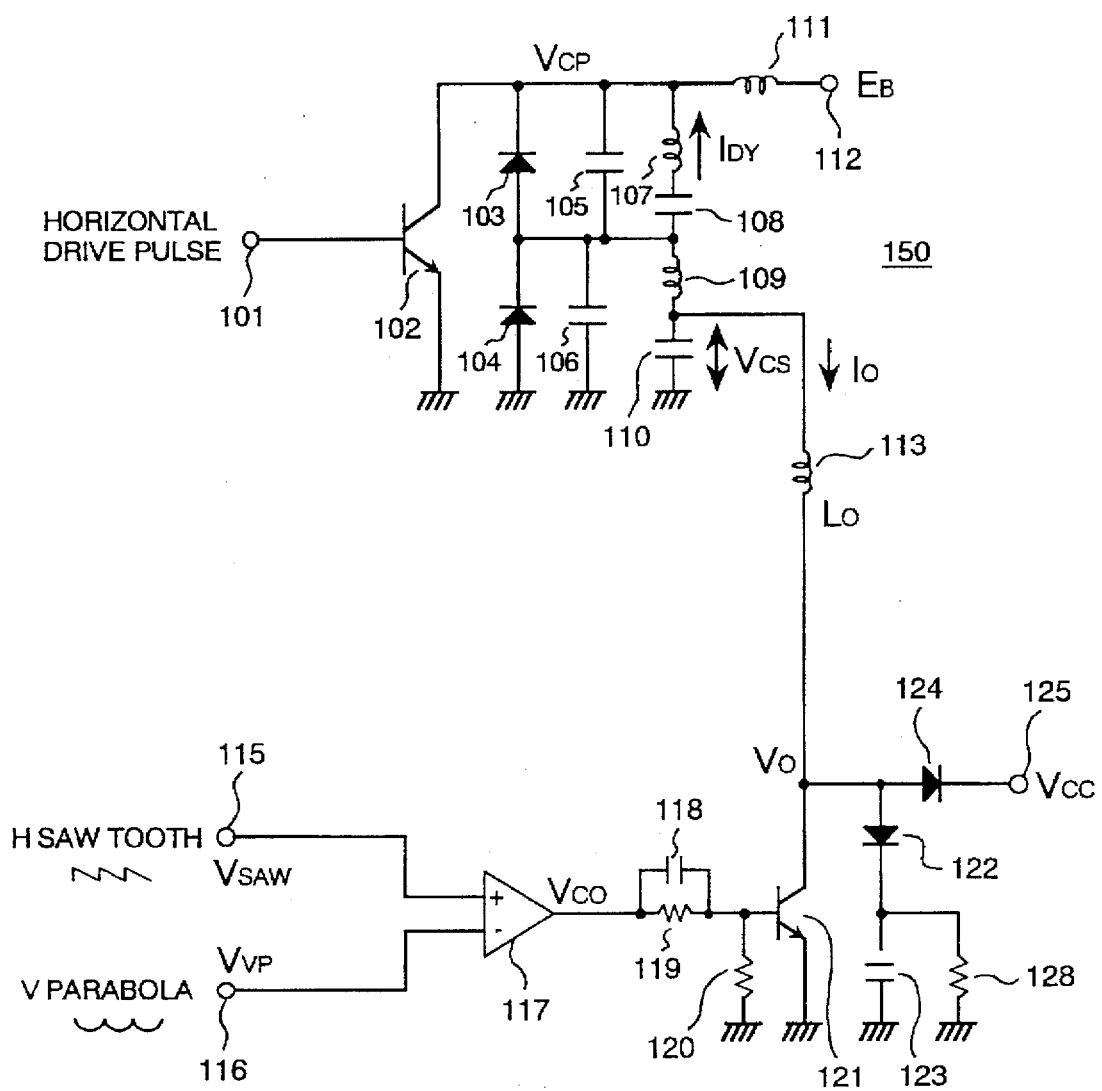
FIG. 14 is a drawing showing the fifth embodiment of the present invention.

In the circuit shown in FIG. 14, an electric charge is accumulated in the noise reducing capacitor 123 via the back flow preventive switching element 122 when the pulse width control output voltage Vo rises. This charge is discharged via the resistor 128 while the transistor 121 is off.

Even if the fifth embodiment of the present invention shown in FIG. 14 is used, it is possible to prolong the rise time of the pulse width control output voltage Vo and reduce the high frequency component of a change of the voltage generated when the pulse width control output voltage Vo rises without generating an abnormal resonance in the horizontal deflection output circuit 150. Therefore, vertical stripe noise Generated in the adjacent display device can be removed.

Next, the third embodiment of the present invention will be explained by referring to FIG. 15. The circuit shown in FIG. 15 is different from the fourth embodiment of the present invention shown in FIG. 10 in the connection method of the noise reducing capacitor 123 and the back flow preventive switching element 122 and the connection of a resistor 128.

Figure 15:
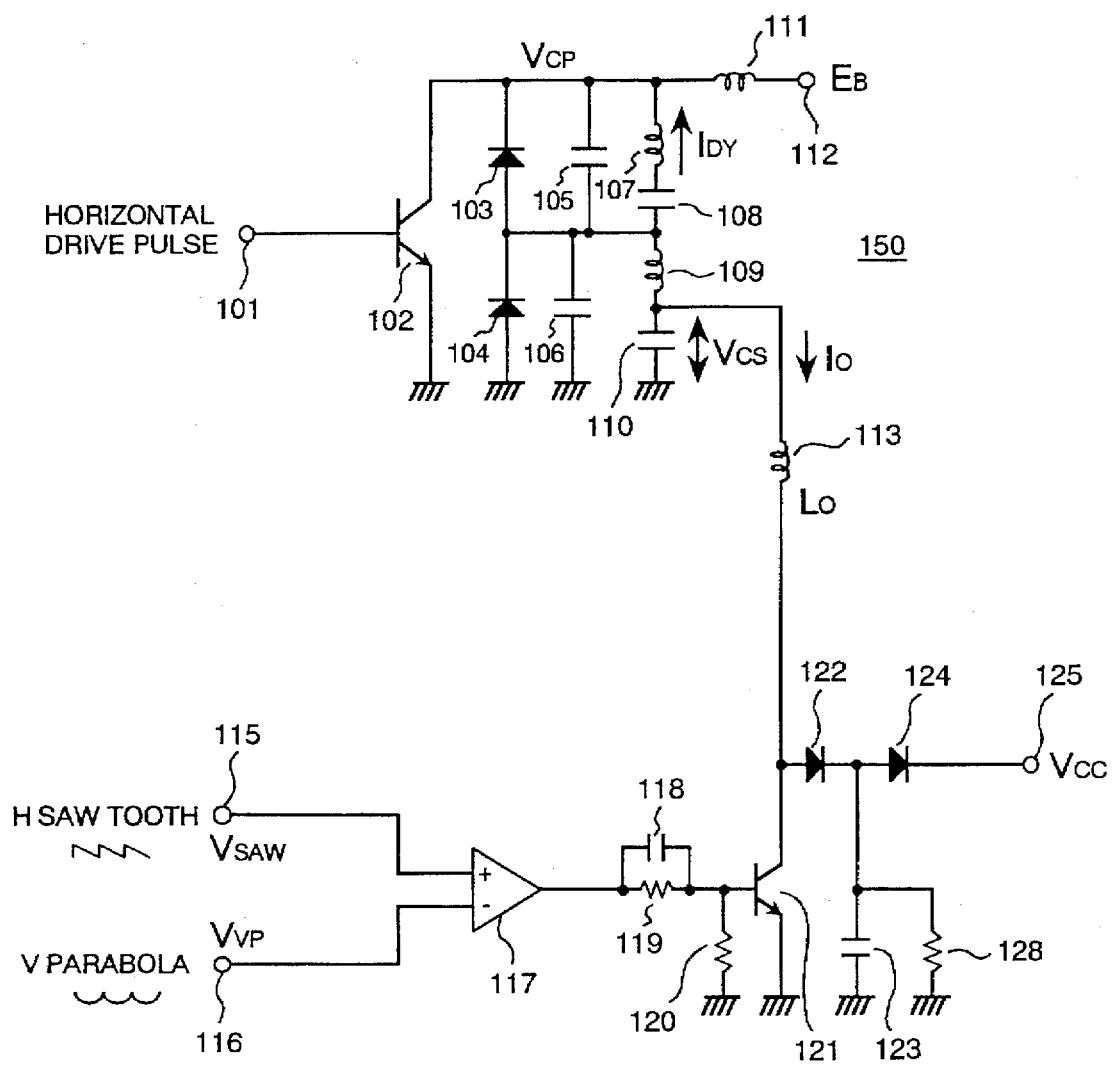
FIG. 15 is a drawing showing the sixth embodiment of the present invention.

Also in the circuit shown in FIG. 15, in the same way as with the fifth embodiment of the present invention shown in FIG. 14, an electric charge is accumulated in the noise reducing capacitor 123 via the back flow preventive switching element 122 when the pulse width control output voltage Vo rises. This charge is discharged via the resistor 128 while the transistor 121 is off.

Even if the sixth embodiment of the present invention shown in FIG. 15 is used, it is possible to prolong the rise time of the pulse width control output voltage Vo and reduce the high frequency component of a change of the voltage generated when the pulse width control output voltage Vo rises without generating an abnormal resonance in the horizontal deflection output circuit 150. Therefore, vertical stripe noise generated in the adjacent display device can be removed.

Next, the whole constitution of the display device of the present invention will be explained by referring to FIG. 16. In FIG. 16, the display system includes an input terminal 130, a signal processing circuit 131, a horizontal deflection circuit 132, a horizontal oscillation circuit 133, a horizontal drive circuit 134, a vertical deflection circuit 136, a video circuit 137, a cathode ray tube 138, a deflection yoke 139, a noise reducing circuit 170, and a mode setting signal input terminal 100.

The display device shown in FIG. 16 switches the aspect ratio by changing the DC bias voltage of the vertical parabolic wave voltage Vvp supplied to the pulse width control circuit 126 by the operation of the signal processing circuit 31 on the basis of a mode setting signal inputted from the mode setting signal input terminal 100. In FIG. 16, the horizontal saw tooth wave voltage VSAW inputted to the pulse width control circuit 126 is generated by the horizontal deflection output circuit 150. However, it may be generated in the signal processing circuit 131, the horizontal oscillation circuit 133, or the horizontal drive circuit 134.

In FIG. 16, the noise reducing circuit 170 comprises the noise reducing capacitor 123 and the back flow preventive switching element 122 described in the forth embodiment (FIG. 10) of the present invention, the fifth embodiment (FIG. 14) of the present invention, or the sixth embodiment (FIG. 15) of the present invention.

As a result, in the display device shown in FIG. 16, it is possible to prolong the rise time of the pulse width control output voltage Vo and reduce the high frequency component of a change of the voltage generated when the pulse width control output voltage Vo rises without generating an abnormal resonance in the horizontal deflection output circuit 150. Therefore, vertical stripe noise generated in the adjacent display device can be removed.

The present invention is effective in all problems caused by the high frequency component of a change of the voltage generated when the pulse width control output voltage Vo rises such as vertical stripe noise generated not only in the adjacent display device but also in the display device itself.

As described above, according to the present invention, to generate a horizontal size control voltage to be supplied to a horizontal deflection output circuit of a diode modulation type, a pulse width control circuit comprising an error amplifier circuit, a comparator connected to the error amplifier circuit, a pulse width control output circuit connected to the comparator and the horizontal deflection output circuit of a diode modulation type, and a feedback voltage generation circuit connected to the comparator and the error amplifier circuit is used. By using the pulse width control circuit having the constitution mentioned above, the horizontal size variable range can be expanded stably and pictures of aspect ratios of 16:9 and 4:3 can be switched stably.

According to the present invention, the high frequency component of a change of the voltage generated when the pulse width control output voltage rises can be made smaller without generating an abnormal resonance in the horizontal deflection output circuit. Therefore, unnecessary radiation generated when the pulse width control output voltage rises can be decreased. Therefore, problems of vertical stripe noise generated when the control range of the pulse width control circuit is expanded can be solved.

We claim:

1. A display device comprising a horizontal deflection circuit for driving a horizontal deflection coil of a cathode ray tube, a vertical deflection circuit for driving a vertical deflection coil of said cathode ray tube, and a video circuit for driving a cathode electrode of said cathode ray tube, wherein said horizontal deflection circuit has a horizontal deflection output circuit of a diode modulation type and a pulse width control circuit for outputting a horizontal size control voltage for controlling the amplitude of a horizontal deflection current flowing through said horizontal deflection output circuit of a diode modulation type and said pulse width control circuit has an error amplifier circuit for inputting a reference voltage for deciding the horizontal size on the display screen and a feedback voltage, a comparator for inputting the output voltage of said error amplifier circuit and a saw tooth wave voltage of the horizontal scanning period, a feedback voltage generation circuit for generating said feedback voltage from the output of said comparator, and a pulse width control output circuit for generating said horizontal size control voltage from the output of said comparator.

2. A display device according to claim 1, wherein said horizontal size control voltage is supplied to said horizontal deflection output circuit of a diode modulation type from said pulse width control output circuit via a choke coil and intermittently changed so that a horizontal size control current flowing through said choke coil becomes almost 0 for a fixed period.

3. A display device according to claim 1, wherein said feedback voltage generation circuit has an inverter for inverting output of said comparator and an integral circuit for obtaining a feedback voltage by integrating said inverter and supplying it to said error amplifier circuit.

4. A display device according to claim 1, wherein a horizontal size variation correction circuit is installed between said horizontal deflection output circuit of a diode modulation type and said error amplifier circuit in said pulse width control circuit.

5. A display device according to claim 4, wherein said horizontal size variation correction circuit is a series circuit of a capacitor and a resistor.

6. A display device according to claim 1, wherein a voltage obtained by dividing a fly-back pulse generated at the output terminal of a horizontal output element in said horizontal deflection output circuit is used as a feedback voltage to a horizontal AFC circuit in said horizontal deflection circuit.

7. A display device according to claim 6, wherein a capacitor is used as means for dividing said fly-back pulse.

* * * * *